United States Patent Office 2,943,013
Patented June 28, 1960

2,943,013

HIGH ASH CONTENT ABSORBENT PAPER FOR THE DECORATIVE LAMINATING INDUSTRY AND A PROCESS FOR PREPARING THE SAME

Hanns F. Arledter, Stockbridge, Mass., assignor, by mesne assignments, to Hurlbut Paper Company, a corporation of Ohio No Drawing. Filed July 27, 1956, Ser. No. 600,411

13 Claims. (Cl. 162—157)

The present invention relates to a paper product and a method of preparing the same, and more particularly to a high ash content absorbent paper for the decorative laminating industry and to a process for preparing the same.

A conventional decorative laminate, such as one used for table and counter tops, contains several plies of core stock, such as kraft paper, generally bonded together with from about 32% to about 40% of a laminating resin. On top of the core stock there is located an opaque absorbent paper generally containing from about 40% to about 70% of a laminating resin and in many instances printed on its upper surface with a decorative design, such as a wood grain pattern. The printed or plain color absorbent paper is covered with an overlay sheet generally containing from about 55% to about 75% of a laminating resin, the overlay sheet being transparent in order that the printed design upon the absorbent paper can show through the overlay sheet and also being abrasion resistant in order to protect the printed design on the absorbent paper sheet against wear.

The present invention is concerned with the absorbent paper sheet used in a decorative laminate. Heretofore, such absorbent papers have suffered from many defects. The present day absorbent papers possess some of the desirable properties necessary in such a paper, but they do not possess all of the desirable properties. For example, they are defective in regard to printability, resin solution absorbency, resin solution penetration rate and treating speed, opacity, and lightfastness. In view of these deficiencies of the absorbent papers now available to the trade, the decorative laminating industry has been interested in obtaining an absorbent paper which would possess all of the desirable properties rather than only a few.

Accordingly, it is an object of the present invention to provide an absorbent paper having high resin solution absorbency, penetration rate and treating speed, excellent printability, high opacity, and good lightfastness against ultraviolet light and sunlight. Further objects are to provide an absorbent paper which has high ash content, good moldability for curved surfaces, and which is uniform throughout and does not show any marked two-sidedness. It is also an object to provide a process of preparing such a paper.

The high ash content absorbent paper of the present invention which possesses all of the above properties contains fibers, filler particles, guar gum, and polyethyleneimine or melamine formaldehyde resin.

The paper contains from about 30% to about 70% of cellulosic or synthetic fibers. The cellulosic fibers may be, for example, alpha-cellulose, sulfite cellulose, sulfate cellulose, cotton, linen, rag, and the like, as well as mixtures thereof. The synthetic fibers may be viscose rayon, cellulose acetate, glass fibers, and the like.

The paper also contains from about 70% to about 30% of filler particles. Of these filler particles from about 20% to about 40% are siliceous filler particles or similar products like aluminum oxide and from about 10% to about 25% are opacifying filler particles.

The siliceous filler particles include, for example, particles of silica, magnesium silicates, and diatomaceous earth, diatomaceous earth particles being the preferred siliceous filler particles. The siliceous filler particles of the invention, as exemplified by diatomaceous earth, were found to possess many properties not possessed by filler particles generally used in the paper industry as noted below.

As the amount of filler in a paper increases the printability and ink acceptance of the paper also increases. With most fillers, however, as the amount of filler in a paper increases, the resin penetration rate of the paper decreases. In using diatomaceous earth, however, the reverse is true, i.e., as the amount of a diatomaceous earth filler in a paper increases, the resin penetration rate of the paper also increases. Also with most fillers as the filler content of a paper increases the density of the paper also increases while the percent resin pickup decreases. With diatomaceous earth, however, the reverse again is true, i.e., as the diatomaceous earth content of a paper increases, the density decreases and the percent resin pickup increases. Furthermore, the printability of paper with increasing amount of diatomaceous earth becomes progressively better and to a far greater extent than does the printability of paper with correspondingly increasing amounts of other fillers. Siliceous fillers also impart to papers and laminates greater dimensional stability than do conventional fillers. This is an important factor in press rooms not equipped with constant temperature and humidity controls. Siliceous fillers also possess a smoother and more receptive surface to ink applied to an absorbent paper in printing than do conventional fillers. Siliceous fillers are inert and reduce the moisture absorbency of the final decorative laminate in an amount of 20% to 30%. Diatomaceous earth shows excellent suspension properties which results from its porous, fluffy nature and low apparent density. It does not shrink on drying, and hence the original density is maintained after wetting and redrying. Diatomaceous earth shows a flattening affect caused by the irregular diatom shape which diffuses light efficiently and produces a dull non-glaring sheet surface which yields through high gloss an even response in the resin treated laminating surface. Even in a highly calendered sheet, uniform resin penetration rate is obtained and low angle sheet is reduced.

The size of the siliceous filler particles is critical and must lie in the range from about 2 to about 8 microns diameter. This particle size is necessary in order to produce an absorbent paper having excellent resin penetration rate and absorbency, resistance to abrasion, good siliceous filler bonding in the paper, and excellent printability. Siliceous filler particles less than about 2 microns, on the other hand, impart to an absorbent paper only fair resin penetration rate, while siliceous filler particles having a size greater than about 8 microns impart to an absorbent paper very little resistance to abrasion and poor bonding of the siliceous filler particles in the paper. The siliceous filler particles or comparable fillers used have a refractory index below 2.3.

While all filler particles impart opacity to a paper filled with the same, siliceous fillers, such as diatomaceous earth, do not impart any opacity to an absorbent paper which has been impregnated with a laminating resin and then incorporated in a decorative laminate. Since the paper of the invention must be opaque after impregnation with the resin employed in order that the color of the decorative laminate core stock, which is usually brown kraft paper, will not show through the laminated absorbent paper, it is necessary to incorporate into the paper opacifying fillers, such as titanium dioxide and zinc sulfide, having a refractory index above 2.3. In order to achieve the required opacity in the absorbent paper it is desirable that the opacifying filler particles have a particles size below about 1 micron in diameter, and preferably in the range from about 0.25 microns to about 5 microns in diameter.

As noted above the high ash content absorbent paper contains from about 70% to about 30% of filler particles of which filler particles from about 20% to about 40% are siliceous filler particles and from about 10% to about 25% are opacifying filler particles. The relative amounts of the siliceous filler particles and the opacifying filler particles are critical in order to achieve the objects of the invention. For example, if an absorbent paper is prepared lying outside of the scope of the invention and containing 15% zinc sulfide particles, 15% diatomaceous earth particles and 70% sulfite cellulose fibers, then the printability of the paper and the dimensional stability of a laminate prepared therefrom is only good, while an absorbent paper prepared in accordance with the invention containing 15% of zinc sulfide particles, 35% diatomaceous earth particles and 50% sulfite cellulose fibers has excellent printability and a laminate prepared therefrom has excellent dimensional stability. In addition, the resin penetration rate of the paper lying outside the scope of the invention is twice as slow as the resin penetration rate of the paper lying within the scope of the invention.

In addition to the fibers and the filler particles, the absorbent paper of the invention must contain a synergistic mixture of guar gum and polyethyleneimine or melamine formaldehyde resins in order to achieve the high ash content and further to achieve high filler retention and thereby a small loss of filler particles in the white water. The absorbent paper accordingly contains from about 0.3% to about 1.5% based on the fiber and filler content of the paper of polyethyleneimine or melamine formaldehyde resins as well as from about 0.1% to about 1.0% based on the filler and fiber content of the paper of guar gum. This synergistic combination of guar gum and melamine formaldehyde of polyethyleneimine resins flocculates the filler particles and fibers extremely well and thereby makes it possible to obtain a filler and stock retention of over 85% and up to 98%, the latter value heretofore not achieved or thought possible in the preparation of a water-laid paper. While the fixation of pigments or colors in the manufacture of regular paper is less difficult because sizing, such as rosin size, can be used, the difficulties of holding high amounts of filler particles in absorbent papers with the required high absorbency in the absence of such sizing, will be appreciated.

In lieu of guar gum there may be used other mucilaginous substances, for example, a modified guar gum, such as methylated guar gum, mannogalactan, "Keltex" (sodium alginate), "Keraton," and protein substances. Urea melamine resins may be readily substituted for the melamine formaldehyde resin. Polyethyleneimine is sold commercially as a technical solution containing 50% solids under the trade names "PEI" or "Polymins P." This product, which is a polymer of ethyleneimine, is polymerized to a degree where water solubility is still retained and polymerization is stopped just before water-insoluble products are formed.

Various modifications of the high ash content absorbent paper are possible in order to further improve some of the beneficial properties of the paper. For example, part of the cellulosic fiber content of the paper may be replaced by from about 5% to about 15% of glass fibers having a diameter of from about 0.5 microns to about 3 microns in order to further increase the resin penetration rate, paper uniformity and printability, and to further prevent two-sidedness. Also part of the cellulosic fiber content of the paper may be replaced by from about 5% to about 20% of fine papermaker fibers, such as esparto, straw and begasse, having a diameter of from about 8 microns to about 15 microns in order to further improve the resin penetration speed and printability of the absorbent paper. In addition, part of the cellulosic fiber content of the absorbent paper may be replaced by from about 7% to about 35% of precut long synthetic organic fibers, such as fibers of acetate rayon, viscose rayon, and polyacrylonitrile, having a length in excess of 6 millimeters, and preferably a length from about 6 millimeters to about 15 millimeters, in order to further improve the moldability, wet strength, tear, edge tear, and wet Mullen of the absorbent paper.

None of the absorbent papers used in the decorative laminating industry to date show comparable results with the paper of the invention in regard to print clarity, ink receptivity, and richness of print color in the final laminate. A paper which shows good printability does not necessarily show ideal printing in the final laminate. Treating of the printed paper with a laminating resin solution, drying and precuring the resin in the printed paper, reconditioning the same in air, followed by laminating under heat and pressure sometimes causes dimensional changes, sweating and other changes in the paper so that the printed design on paper in the laminate does not show the coverage of the printed surface equal to that expected of a printed design in the calendered paper. It must, therefore, be borne in mind that printability of papers for the decorative laminating industry has to be evaluated in the final laminate. The paper of the invention, however, shows especially good printed design characteristics in the laminate and a surface microscopic view reveals a very uniform print in the laminate because the paper has little swelling tendency and high dimensional stability. It will be understood that the printability of the paper can be further improved if the surface is coated or treated with chemicals known in the art to improve printability, such as methyl cellulose, carboxy-methyl cellulose, or surface active agents like N-N', N-N'-tetrakis-2-hydroxy propyl ethylene diamine.

The process of the invention for preparing the high ash content absorbent paper comprises forming an aqueous slurry of the fibers, filler particles and guar gum, adding thereto the polyethyleneimine or melamine formaldehyde resin to flocculate the fibers and filler particles, forming a paper web upon the wire of the paper-making machine, dewatering, drying, and calendering the paper web. It is essential in the process that the guar gum be added to the beater stock containing the filler particles before the polyethyleneimine or melamine formaldehyde resin is added thereto in order to achieve the high filler retention of, for example, 85–98%. If the reverse order of addition is employed when using polyethyleneimine, i.e., adding the polyethyleneimine first and then adding the guar gum second, the filler retention may be reduced. The best results are obtained when the pH of the fiber slurry lies in the range of about 5.5 to about 7.5.

The process may be further modified and improved if an alkali, such as ammonia or sodium hydroxide, is added to the stock to give a pH of from about 8.0 to about 9.5 and the stock then neutralized with an inorganic aluminum salt, such as alum or aluminum chloride, to a pH of from about 5.5 to about 7.5, and preferably from about 6.0 to about 7.0. By this modification, the attraction of the fibers for the filler particles and the flocculation of the stock can be improved as well as the light fastness of the filler particles. The aluminum hydroxide formed during the neutralization coats the filler particles with a fine coating or hide and thereby reduces the graying tendency of the filler particles under the influence of ultraviolet light and sunlight. This coating of aluminum hydroxide is best applied at a point where the coating is not removed from the surface of the filler particles by mechanical action. Therefore, the alkali may be added at any point during the processing of the paper slurry before it reaches the headbox, but the inorganic aluminum salt should be added somewhere close to the headbox or in the headbox of the papermaking machine.

The annoying graying tendency of paper containing zinc sulfide filler in melamine laminates under the influence of moisture and ultraviolet light is the main factor which limits the use of zinc sulfide filler containing papers in decorative laminates. Titanium dioxide containing paper does not show any graying tendency under the influence of ultraviolet light and moisture, but discolors under the influence of sunlight, while zinc sulfide containing absorbent papers do not show discoloration in sunlight. Paper according to the invention with reduced or no graying tendency in melamine laminates, under the influence of ultraviolet light and moisture, is therefore useable under all conditions without excessive graying or discoloration.

Many studies have been made by a number of investigators about the graying tendency of zinc sulfide containing absorbent papers and the prevention of graying of such papers in melamine laminates, but no conclusive results have been obtained so far. The method according to the invention, for the first time, permits the obtention of reproducible results in regard to reduced or no graying tendency in laminates prepared from paper containing zinc sulfide filler particles.

No claim is made that the theoretical explanation of the reduction of the graying tendency is correct. It was found, though, that the method of adjusting the paper stock in the beater or chest to a pH above about 8.0, preferably with ammonia, and reducing the pH of the paper stock to about 6.0-7.0 in the headbox with alum or aluminum chloride to form aluminum hydroxide and adding zinc oxide in small amount to act as an acid acceptor, yields the stated results.

The high ash content absorbent paper after calendering may be further processed by printing the surface thereof with any suitable design, such as a wood grain design. After printing, the decorative absorbent paper is then impregnated with from about 40% to about 70% of a laminating resin and incorporated in a decorative laminate by laminating under heat and pressure to cure the laminating resin. The laminating resin, i.e., a liquid resin which by the use of heat and/or a catalyst is converted to a solid infusible matter, may be, for example, a melamineformaldehyde resin; a phenolic resin, such as phenol-formaldehyde, phenol-cresolformaldehyde, orthocresol-formaldehyde; an epoxy resin or a modified epoxy resin, such as the condensation products of epichlorohydrin with diphenols, such as bisphenol A; diallylphthalate polymers sold under the trade name "D.A.P."; a polyester resin such as unsaturated organic compounds made by the reaction between hexamethyleneglycol and ethyleneglycol and maleic acid or adipic acid containing a plurality of ester groupings which can be polymerized alone or copolymerized with other unsaturated monomers like styrene to give 3-dimensional cross-link structures; isocyanate-polyester resins obtained when liquid polyoxy compounds are combined with di- or tri- isocyanates and sold under the trade name "Desmophen" or the polyoxy compounds like "Desmophen 800," "1100" and "Desmodur"; polymethacrylate; polymethylmethacrylate; and the like.

The product and process of the invention will be further illustrated by the following examples:

*Example 1*

Fifty pounds of sulfite cellulose fibers were beaten to a beating degree of 25° S.R. Sixteen pounds of zinc sulfide particles having a size of 0.5 micron diameter and 0.4 pounds zinc oxide were then added followed by the addition of 32 pounds of diatomaceous earth, 50% of the diatomaceous earth particles having a size of 2-4 microns diameter and 50% having a size of 4-8 microns diameter. The pH of the fiber slurry was adjusted to 9.0 with 100 cc. of 30% ammonia and the stock diluted to 5 grams per liter with white water from the paper machine. 1.7 pounds of alum as a 1% solution were then added to the fiber-filler slurry just before the screen of the paper machine, thereby adjusting the pH of the slurry to 6.2. 90 grams of guar gum as a 0.2% solution was added to the stock and the stock flocculated by the subsequent addition of 225 grams of melamine formaldehyde resin as a 0.3% solution. The paper was then formed by feeding the slurry to the wire of a paper machine, dewatering, drying, and calendering the paper web. The high ash content absorbent paper so formed contained 52% sulfite cellulose fibers, 48% filler particles (32% diatomaceous earth particles having a size of 2-8 microns diameter and 16% zinc sulfide particles having a size of 0.5 microns diameter), 0.2% guar gum based on the fiber and filler content of the paper, and 0.5% melamine formaldehyde resin based on the filler and fiber content of the paper. The paper had an opacity of 97% and upon printing with a wood grain design showed excellent printability.

The paper was impregnated with a 50% melamine formaldehyde resin solution, thereby adding 51% of resin to the paper. The volatile content of the resin was adjusted to 4-5% and the flow to 6%. The printed and impregnated absorbent paper was then incorporated into a decorative laminate by placing the absorbent paper, printed side up, upon a plurality of plies of kraft core stock impregnated with a phenolformaldehyde resin and covering the absorbent sheet with an alpha-cellulose overlay paper impregnated with a phenolformaldehyde resin. The laminate was pressed at 300° F. and 1,000 p.s.i. for 15 minutes. The printed wood grain design of the laminate showed excellent color, brightness and sharp detail. There was no graying tendency of the printed absorbent paper in the laminate after 12 hours exposure to ultraviolet light under water, nor was there any discoloration in a fadeometer. The dimensional stability of the laminated surface was excellent.

*Example 2*

Forty pounds of sulfite cellulose fibers, 10 pounds of fine esparto fibers having a diameter of 10 microns, 15 pounds of titanium dioxide particles having a size of 0.5 microns diameter, and 20 pounds of diatomaceous earth particles having a size of 3.5 microns diameter were beaten to a beating degree of approximately 28° S.R. Five pounds of glass fibers having a diameter of 1 micron were added and the stock brushed with raised beater roll until the glass fibers were uniformly distributed and shortened to papermaker length. The stock was diluted to a stock consistency of 6 grams per liter and pumped in a continuous flow to the headbox of a paper machine where guar gum was added in an amount of 0.2% based on the filler and fiber content of the finished paper in a solution containing 3 grams per liter of solid guar gum. The fiber slurry was flocked shortly before the stock hit the wire of the paper machine with 0.7% polyethyleneimine added as a 1% solution having a pH of 8.4. A paper web was formed on the wire of the papermaking machine, dewatered, dried, and calendered. The absorbent paper so produced contained 60.5% fibers (44% sulfite cellulose fibers, 5.5% glass fibers having a diameter of 1 micron, and 11% of fine esparto fibers having a diameter of 10 microns), 39.5% of filler particles (16.5% titanium dioxide particles having a diameter of 0.5 microns and 23% of diatomaceous earth particles having a size of 3.5 microns), 0.2% of guar gum based on the filler and fiber content of the paper, and 0.7% of polyethyleneimine resin based on the filler and fiber content of the paper.

The absorbent paper was then printed with a wood grain design and showed excellent clarity, brightness, deepness of color, and excellent ink receptivity. When incorporated into a decorative laminate, the paper still had an excellent print and dimensional stability.

Example 3

Forty pounds of sulfite cellulose fibers were beaten together with 10 pounds of zinc sulfide particles having a size of 0.5 microns diameter, 10 pounds of titanium dioxide particles having a size of 0.5 microns diameter, 10 pounds of alumina particles, and 20 pounds of diatomaceous earth particles having a size of 6 microns diameter, to a beating degree of 30 S.R. The stock was diluted to 4 grams per liter and 12 pounds of acetate rayon fibers containing 1.5% titanium dioxide pigment and having a length of 9 millimeters was added to the diluted stock in the headbox together with 0.2 pounds of guar gum. The stock was then flocculated with 1.0 pound of polyethyleneimine resin shortly before the stock hit the wire of the paper machine. A paper web was formed on the paper machine, dewatered, dried, and calendered. The high ash content absorbent paper so formed contained 50% of fibers (38% sulfite cellulose fibers and 12% long acetate rayon fibers having a length of 9 millimeters), 50% of filler particles (10% zinc sulfide particles having a diameter of 0.5 microns, 10% titanium dioxide particles having a diameter of 0.5 microns, 10% alumina particles, and 20% of diatomaceous earth particles having a size of 6 microns diameter), 0.2% guar gum and 1% polyethyleneimine resin, both based on the filler and fiber content of the paper. The paper had high resin penetration rate, good printability, excellent opacity, and excellent moldability in curved laminates.

Various modifications and changes other than those set forth above may be made in the invention without departing from the spirit thereof, and accordingly the invention is to be limited only within the scope of the appended claims.

I claim:

1. A high ash content absorbent paper for the decorative laminating industry which is lightfast consisting of an interfelted fibrous web containing from about 30% to about 70% of cellulosic fibers, from about 70% to about 30% respectively of filler particles, from about 0.1% to about 1% based on the filler and fiber content of the paper of a mucilaginous substance selected from the group consisting of guar gum, methylated guar gum, sodium alginate, and mannogalactan, and from about 0.3% to about 1.5% based on the fiber and filler content of the paper of a resin selected from the group consisting of polyethyleneimine, melamine formaldehyde, and urea melamine resins; said filler particles containing from about 20% to about 40% of siliceous filler particles having a size of from about 2 microns to about 8 microns diameter and a refractory index below 2.3 and from about 10% to about 25% of opacifying filler particles having a size of less than 1 micron diameter, a refractory index above 2.3, and a coating thereon of aluminum hydroxide to impart lightfastness thereto.

2. A high ash content absorbent paper as set forth in claim 1 wherein the siliceous filler particles are particles of diatomaceous earth.

3. A high ash content absorbent paper as set forth in claim 1 wherein the opacifying filler particles are particles of zinc sulfide.

4. A high ash content absorbent paper as set forth in claim 1 wherein the opacifying filler particles are particles of titanium dioxide.

5. A high ash content absorbent paper as set forth in claim 1 wherein the size of the opacifying filler particles lies in the range from about 0.25 microns to about 0.5 microns diameter.

6. A high ash content absorbent paper as set forth in claim 1 wherein part of the cellulosic fibers are replaced by from about 5% to about 15% of glass fibers.

7. A high ash content absorbent paper as set forth in claim 1 wherein part of the cellulosic fibers are replaced by from about 5% to about 20% of fine papermaker fibers having a diameter of from about 8 microns to about 15 microns.

8. A high ash content absorbent paper as set forth in claim 1 wherein part of the cellulosic fibers are replaced by from about 7% to about 35% of long synthetic organic fibers.

9. A high ash content absorbent paper as set forth in claim 1 having a pH of from about 6.0 to about 7.0.

10. The process of preparing a high ash content absorbent paper which is lightfast comprising forming an aqueous slurry at a pH of from about 8 to about 9.5 of from about 30% to about 70% of cellulosic fibers, from about 70% to about 30% respectively of filler particles, and from about 0.1% to about 1% based on the fiber and filler content of the paper of a mucilaginous substance selected from the group consisting of guar gum, methylated guar gum, sodium alginate, and mannogalactan, said filler particles contain from about 20% to about 40% of siliceous filler particles having a size of from about 2 to about 8 microns diameter and a refractory index below 2.3 and from about 10% to about 25% of opacifying filler particles having a size of less than about 1 micron diameter and a refractory index above 2.3; adding an inorganic aluminum salt to reduce the pH to the range from about 5.5 to about 7.5 and to coat the opacifying filler particles with a hide of aluminum hydroxide that imparts lightfastness thereto in the finished paper; adding from about 0.3% to about 1.5% based on the fiber and filler content of the paper of a resin selected from the group consisting of polyethyleneimine, melamine formaldehyde, and urea melamine resins thereto to flocculate the fibers and filler particles; forming a paper web on the wire of a papermaking machine; dewatering, drying, and calendering the paper web.

11. The process as set forth in claim 10 wherein the cellulosic fibers are mixed with from about 5% to about 15% of glass fibers.

12. The process as set forth in claim 10 wherein the cellulosic fibers are mixed with from about 5% to about 10% of fine papermaker fibers having a diameter of from about 8 microns to about 15 microns.

13. The process as set forth in claim 10 wherein the cellulosic fibers are mixed with from about 7% to about 35% of long synthetic organic fibers.

References Cited in the file of this patent

UNITED STATES PATENTS

| | | |
|---|---|---|
| 2,071,025 | Colbert et al. | Feb. 16, 1937 |
| 2,246,818 | Sherwood | June 24, 1941 |
| 2,336,797 | Maxwell | Dec. 14, 1943 |
| 2,366,400 | Harrison | Jan. 2, 1945 |
| 2,378,193 | Cummins | June 12, 1945 |
| 2,526,125 | Francis | Oct. 17, 1950 |
| 2,563,897 | Wilson et al. | Aug. 14, 1951 |
| 2,680,682 | Dearing | June 8, 1954 |
| 2,685,508 | Spear | Aug. 3, 1954 |
| 2,687,447 | Merrill | Aug. 24, 1954 |
| 2,694,630 | Landes et al. | Nov. 16, 1954 |
| 2,698,793 | Landes | Jan. 4, 1955 |
| 2,773,763 | Scott | Dec. 11, 1956 |

OTHER REFERENCES

Casey: "Pulp and Paper," vol. I, Interscience Publishers, Inc., New York, 1952, page 470.